Patented Sept. 6, 1932

1,876,085

UNITED STATES PATENT OFFICE

KARL STAIB, OF BITTERFELD, GERMANY, ASSIGNOR, BY MESNE ASSIGNMENTS, TO MAGNESIUM DEVELOPMENT CORPORATION, A CORPORATION OF DELAWARE

METHOD OF MAKING ANHYDROUS MAGNESIUM CHLORIDE

No Drawing. Application filed March 6, 1928, Serial No. 259,595, and in Germany March 6, 1926.

This invention relates to the production of molten anhydrous magnesium chloride from magnesium oxide.

This application is a continuation in part of my copending application Serial No. 172,216, filed March 2, 1927.

In maintaining reactions between solids and gases, especially at elevated temperatures, it is often difficult to provide the solid substance with a surface sufficiently large to maintain the reaction at the desired velocity, without provoking, where the reaction is exothermic, a detrimental sintering or melting. Consequently it is necessary to either continuously expose fresh surfaces to the reactant gas by agitating or stirring the pulverized solid substances or to mix the finely purverized solid substances with pore-forming materials and to then convert the mixture into solid form.

It has been attempted to avoid these difficulties by applying the principles of coal-dust firing to the exothermic oxidation of substances which are easily oxidized by air, for instance, sulfides, or to the nitrogenization of carbides. A similar process has also been recommended for the production of metal halides, particularly aluminum chloride in volatile form, from raw material containing the corresponding metal oxide, by injecting such pulverized raw material, together with fuel, a combustion-supporting gas such as air, and a halogen, into a combustion and reaction chamber. However, the presence of air in the reaction mixture causes partial decomposition of the halide formed and thus, although rendering the process thermally self-supporting, tends to diminish the amount of product obtained.

Another process of making volatile aluminum chloride provides for the introduction of aluminous material, fuel (carbon) and chlorine without a combustion-supporting gas into a combustion and reaction chamber. In this case, however, it is necessary to apply external heat throughout the entire course of reaction.

The present invention is concerned with the production of molten anhydrous magnesium chloride from magnesium oxide or magnesium oxide-bearing materials, and it has as a principal object the avoidance of the difficulties of such former processes, that is to say, the avoidance of the necessity of introducing, with the reaction mixture proper, a combustion-supporting gas and the necessity of external heating during the reaction. According to the present invention carbonaceous material and the magnesium oxide, or the magnesium oxide-bearing material, are suspended in a current of chlorine and are injected thusly into a reaction chamber which has been sufficiently preheated to initiate the reaction. For this latter purpose the reaction chamber is preferably preheated to the reaction temperature by any convenient heating device. This initial preheating once accomplished, additional heating may be dispensed with, the heat of reaction sufficing to maintain a proper reaction temperature. In order that the invention may be fully understood the following examples will be referred to.

Example

A mixture of finely ground magnesium oxide and finely ground carbonaceous material, as charcoal or cokified peat in the proportion of about 4 parts of MgO and 1 part of charcoal is injected by means of a current of chlorine through a nozzle into a chamber preheated to 700° C. The temperature of the reaction chamber is then maintained by the reaction heat and the supplementary heating may be discontinued. The small drops of the resulting anhydrous magnesium chloride collect so that the molten mass can be withdrawn from the bottom of the reaction chamber and filtered, if necessary, from the excess of carbon.

The ratio of components may be, as a rule, between one and two atoms of carbon to two molecules of magnesium oxide. As the resulting reaction temperature depends not only upon the exothermic formation of carbon monoxide or dioxide, but also upon the dimensions of the apparatus employed, the mixture when carrying out the process on an industrial scale, is to be proportioned in such a manner that a minimum excess of coal is left in the molten final product. However, an undesired excess of coal may also ultimately be removed from the melt, for instance by filtering.

I claim:—

1. The process of converting magnesium oxide into anhydrous molten magnesium chloride comprising introducing a mixture of about 4 parts of finely ground magnesium oxide and about one part of finely ground cokefied peat, suspended in a current of chlorine gas into a reaction chamber preheated to about 700° C., the reaction heat sufficing to maintain the reaction temperature, and withdrawing molten magnesium chloride from said reaction chamber.

2. The process of converting magnesium oxide into anhydrous molten magnesium chloride comprising introducing a mixture of finely ground magnesium oxide and finely ground carbonaceous material, suspended in a current of chlorine gas, into a reaction chamber sufficiently preheated to start the reaction, and withdrawing molten chloride from said chamber, the heat of reaction sufficing to maintain the reaction.

3. The process of converting magnesium oxide into anhydrous molten magnesium chloride comprising introducing a mixture of finely ground magnesium oxide and carbonaceous material, suspended in a current of chlorine gas, into a reaction chamber preheated to about 700° centigrade, the reaction heat sufficing to maintain the reaction temperature, and withdrawing molten magnesium chloride from said reaction chamber.

4. The process which comprises introducing a mixture of finely divided magnesium oxide and finely ground cokefied peat in a current of chlorine gas into a reaction chamber sufficiently preheated to start the reaction, and withdrawing molten chloride from said chamber, the heat of reaction sufficing to maintain the reaction.

In testimony whereof I affix my signature.

KARL STAIB.